Figure 5:
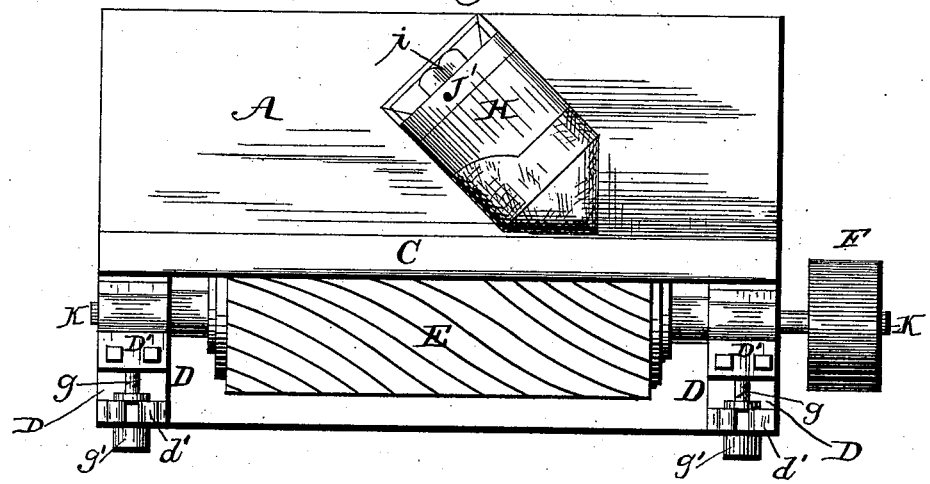

(No Model.) 2 Sheets—Sheet 1.
T. HANFORD & J. E. McLOUGHLIN.
MECHANISM FOR SHEARING CAPS.
No. 323,869. Patented Aug. 4, 1885.
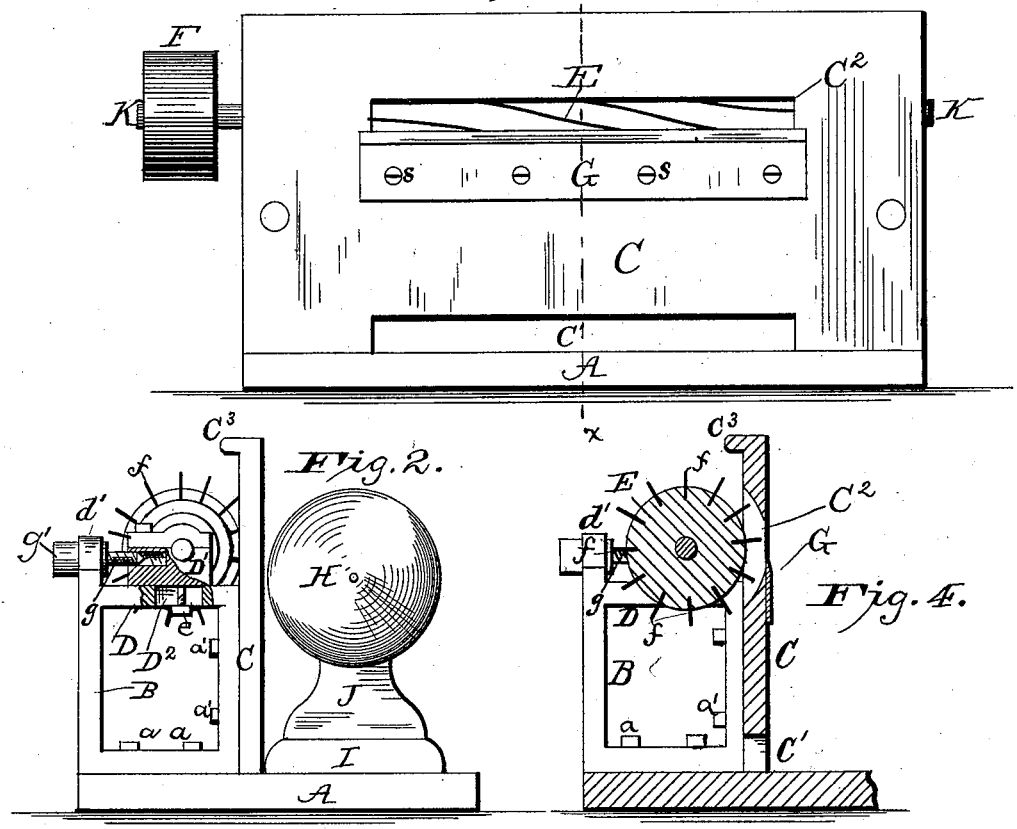
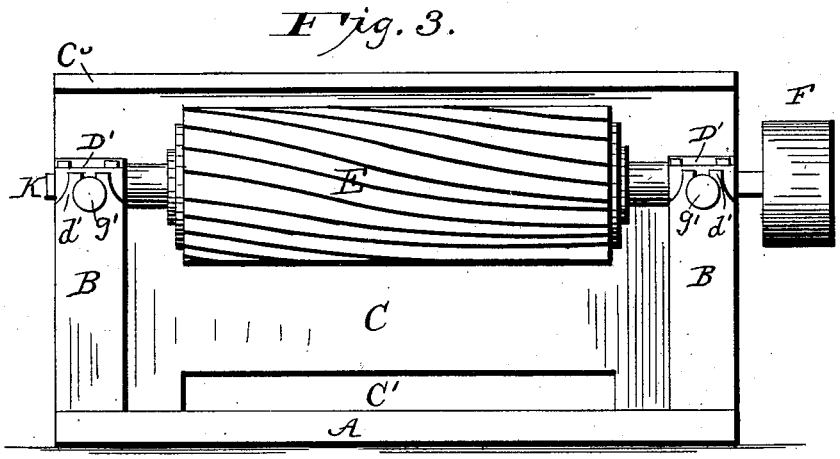

(No Model.) 2 Sheets—Sheet 2.

T. HANFORD & J. E. McLOUGHLIN.
MECHANISM FOR SHEARING CAPS.

No. 323,869. Patented Aug. 4, 1885.

Witnesses:

Inventor:
Thomas Hanford
John E. McLoughlin
by D. J. Johnston,
Atty.

UNITED STATES PATENT OFFICE.

THOMAS HANFORD AND JOHN E. McLOUGHLIN, OF UTICA, NEW YORK, ASSIGNORS TO THE MOHAWK VALLEY SCOTCH CAP FACTORY, OF SAME PLACE.

MECHANISM FOR SHEARING CAPS.

SPECIFICATION forming part of Letters Patent No. 323,869, dated August 4, 1885.

Application filed June 23, 1884. (No model.)

*To all whom it may concern:*

Be it known that we, THOMAS HANFORD and JOHN E. McLOUGHLIN, citizens of the United States, residing at Utica, in the county of Oneida and State of New York, have invented certain new and useful Improvements in Mechanism for Shearing Caps, of which the following is a specification, reference being had therein to the accompanying drawings.

This invention relates to machines for reducing to a uniform length, by shearing the nap on wool-felt or "Scotch" caps; and the said invention consists in certain details of construction and arrangement of the several parts employed to form an organized machine or apparatus for the purpose intended, having special reference to the support and adjustment of the rotary cutter, whereby all parts of the cap may be closely shorn without danger to the fabric or the operator.

This invention is designed as an improvement upon the mechanism for shearing caps patented to Richard Cook and Thomas Hanford on the 3d of October, 1871, No. 19,449, Reissue No. 5,642, dated November 4, 1873, and is intended to overcome certain defects found to exist in said patented machine.

In the accompanying drawings, Figure 1 represents a front view, Fig. 2 an end view, partly in section, and Fig. 3 a rear elevation, of an organized machine or mechanism for shearing caps constructed in accordance with this invention. Fig. 4 represents a vertical transverse sectional elevation on the line $x\ x$ of Fig. 1, and Fig. 5 a plan view of the machine. Fig. 6 is an end elevation, and Fig. 7, a longitudinal section, of the cone-block.

A represents the bed-plate of the machine, made perfectly smooth and level upon its face and bearing at its rear side the support for the shearing devices.

Secured upon the bed-plate A at each end thereof by bolts $a$ are two stands or bracket-supports, B, preferably of the form shown—that is, square, and having a horizontal straight bed or way, D, at its top, and rear extension, $d'$. This flat portion D forms the way for the boxes D', which receive the journals of the rotary cutter E. Vertically through this way D is a slot, D², Fig. 2, to permit of the passage of a bolt, $e$, which enters a threaded hole in the box D', and forms the means by which said boxes are held in place. At the outer ends of said box is another threaded hole, which receives the threaded end of a set-screw, $g$, whose shouldered head $g'$ has a bearing in the slotted extension $d'$ of the stands B. This constitutes the mechanism for supporting and adjusting the rotary cutter, and the said adjustment thereof is effected by first loosening the bolt $e$ and then operating the set-screw $g$, which acts to draw the boxes D', carrying the journals K of the rotary cutter E, either forward or move them backward, and consequently the rotary cutter is brought either nearer to or away from the stationary cutter or ledger-blade G, so that the cutter may be adjusted to compensate for any wear that may take place between it and the ledger-blade. After the boxes have been adjusted, they are secured and held in place by the set-screw $e$.

Upon the face or front edge of the stands B is secured by bolts $a'$, in a vertical position, a guard-plate, C, which has a recess, C', along its central lower portion and rests only at each end upon the bed-plate A. About the center of this guard-plate C is formed an opening, C², Figs. 1 and 4, along the bottom edge of which is arranged a knife or the ledger-blade, G, secured in position by screws $s$ and whose sharp edge projects upward and with the bevel edge thereof on the opposite side from the rotary cutter. The top edge of the guard-plate C is formed with a slight flange or projection, C³, which extends over the rotary shears, as shown in Figs. 2 and 4.

Figure 6:
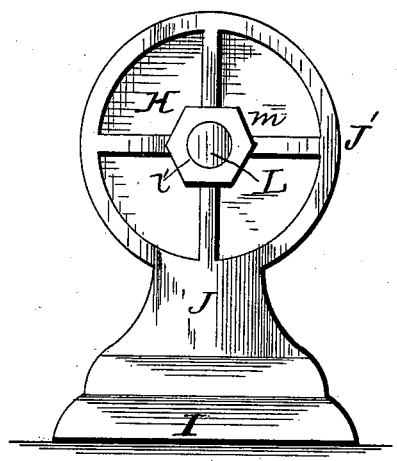
Figure 7:
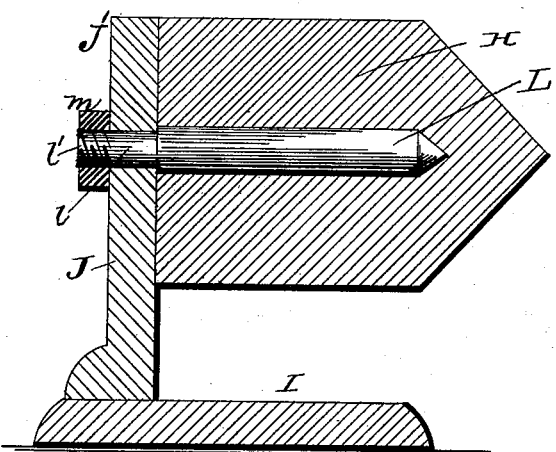

H is the cone-block for holding the cap, supported upon a base-plate, I, by a standard, J, and adapted when in position to rest and slide upon the base-plate A, as shown in Figs. 2 and 5. This cone-block, as also the rotary shearer, may be of the same construction as those employed in the patent before mentioned, or they may be of any desired construction; but the preferred form of cone-block is as follows: The block H is made of a solid piece of wood, at the center of which a metal spindle, L, is tightly driven. The outer end of this spindle has a bearing, $l$, and screw-thread $l'$, by which the block is supported and held in place upon the standard J. This supporting-standard J for the cone-block is made of metal and with a cylindrical head, J', of the same diameter as the cylindrical part of the cone-block. The face of this cylindrical head J' of the standard is made smooth and even, so as to form a close bearing-surface for the end of the cone block, which is caused to abut flush against said head, as shown in Fig. 7. The object of thus forming the head of the standard J is to provide a greater bearing-surface for the cone-block, and by reason of the entire end of the cone-block being supported against its bearing, wabbling of the same is prevented. This is not the case where the cone-block is simply supported by the end of the axle, as in the patent herein referred to. By reason of this construction of the block it is always held tight, and any wear, being equally upon the spindle and end of block, can be taken up by the nut that secures the block to the standard, as seen at $m$.

The advantages derived by constructing and arranging the parts as herein described are, that the rotary cutter is rendered capable of adjustment for compensation of wear. The flange at the top of the guard-plate, projecting as it does above and over the rotary cutter, acts in a measure as a shield to prevent the flying over of the cuttings toward the operator. This provision, although apparently simple in itself, adds greatly to the usefulness of the machine.

The operation of the machine is as follows: Motion is imparted to the shearer E by belt from any convenient motor, passing around the pulley F on the shaft K of said cutter. The cap to be sheared having been drawn over the cone-block, as shown in Fig. 5, said cone-block is slowly advanced against the ledger-knife, causing the projecting nap of the material to enter between the cutting-blades and be evenly cut thereby. As the block is slowly advanced it is revolved upon its axis by the hand of the operator, so as to subject all parts of the cap to the shearing action of the knifes. As the cone-block is advanced toward the ledger-blade, as in Fig. 5, the end of the base-plate I engages beneath the slot C' of the guard-plate C, and thus acts to hold the said cone-block steady.

Having thus fully described our invention, what we claim as new, and desire to secure by Letters Patent of the United States, is—

The combination, with the base-plate, of the stands B B, provided at the top with the way D and a slotted extension, $d'$, the bolts for securing the stands to the base-plate, the guard plate having a central opening, $C^2$, and resting upon the base-plate and secured to the stand, and the ledger-blade, substantially as and for the purpose set forth.

In testimony whereof we affix our signatures in presence of two witnesses.

THOMAS HANFORD.
JOHN E. McLOUGHLIN.

Witnesses:
WILLIAM WRIGHT,
GEO. L. BRADFORD.